June 8, 1937.　　　　J. C. KARNES　　　　2,082,802
PLOTTING BOARD
Filed Feb. 13, 1935
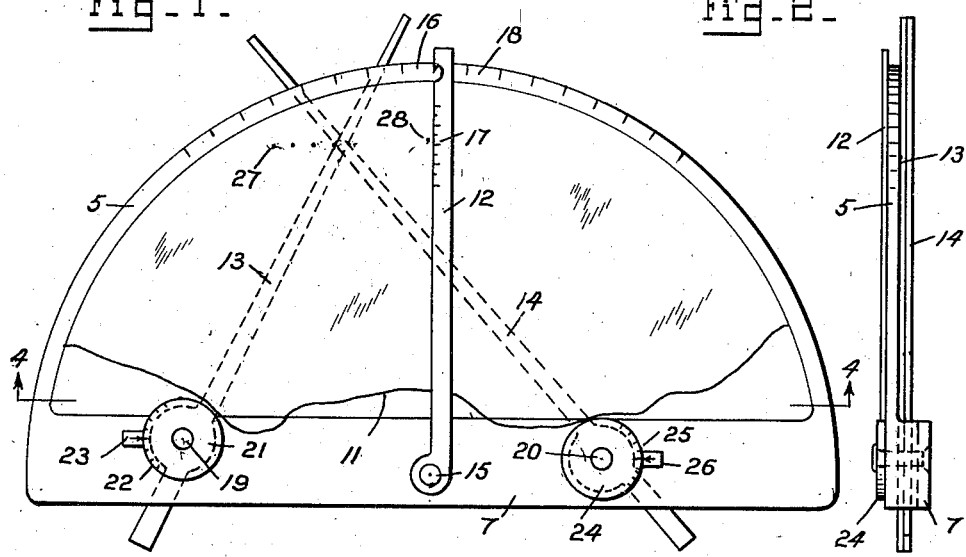
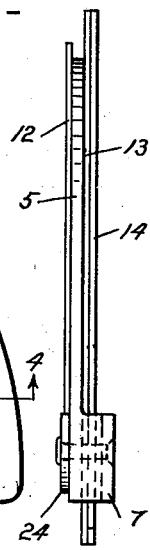
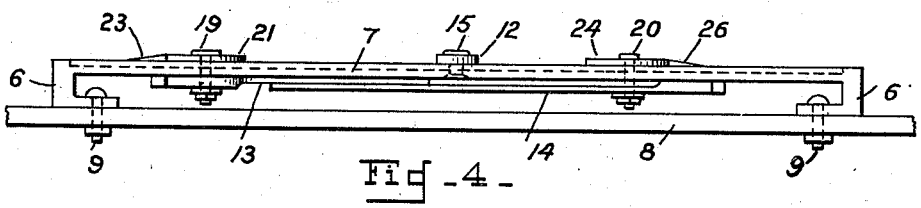
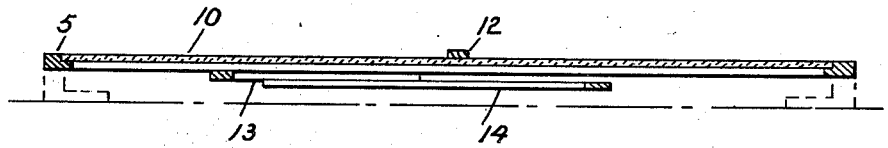
Inventor
James C. Karnes
By W. N. Roach
Attorney Patented June 8, 1937

2,082,802

UNITED STATES PATENT OFFICE 2,082,802

PLOTTING BOARD

James C. Karnes, Buffalo, N. Y.

Application February 13, 1935, Serial No. 6,354

1 Claim. (Cl. 33—98)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a plotting board.

In plotting boards that are employed to determine the data which are to be applied to ordnance so that a projectile will strike the target, it is customary to place the gun arm and the plotting or station arms on the same side of the board. When the observed course of the target has been marked on the map it is necessary, in order to determine the set-forward point or predicted future position, to remove the station arms and apply a predicting device such as is shown in Patent No. 1,754,653 of April 15, 1930. The gun arm is then laid to the set-forward point and the range and azimuth are available. While these operations are being performed the target has continued its course but because of the presence of the predicting device the plotting arms cannot be employed to plot the course.

The purpose of this invention is to provide for the concurrent employment of the gun arm and the plotting arms and to this end they are arranged on opposite sides of a transparent plate.

A practical embodiment of the invention is illustrated in the accompanying drawing, in which, Fig. 1 is a plan view of the improved plotting board.

Fig. 2 is a view in side elevation.

Fig. 3 is a view in rear elevation.

Fig. 4 is a sectional view on the line 4—4 of Fig. 1.

The plotting board comprises a frame 5 having legs 6 on its base side 7 whereby it may be mounted in spaced relation to a support 8. The legs are preferably secured to the support, bolts 9 being shown for this purpose.

The frame has a semi-circular opening which is covered by a transparent plate 10 such as glass, which is fitted in and carried by the frame. The plate 10 takes the place of the map usually employed with plotting boards and for purposes of realism may have painted thereon a representation 11 of a shore line. The major portion of the plate, however, is transparent and this represents the field of fire for a gun.

The base 7 of the frame 5 carries a gun arm 12 which overlies the plate 10 and it also carries a pair of station or plotting arms 13 and 14 which underlie the plate. The gun arm is mounted on a pivot 15 which represents the gun position and is the center of the arc 16 of the frame. The gun arm is provided with a range scale 17 and the upper face of the arc is provided with an azimuth scale 18.

The plotting arms 13 and 14 are similar and are preferably positioned on the left and on the right of the gun arm. These arms are mounted respectively on pivots 19 and 20 which represent the observing stations and have the same relation to the pivot 15 as exists between the observing stations and the gun position. The arms 13 and 14 are arranged in different planes so that they may be crossed.

The pivot 19 of the arm 13 carries a disc 21 which overlies the frame and has an azimuth scale 22 readable against an index 23. The pivot 20 of the arm 14 carries a disc 24 having an azimuth scale 25 readable against an index 26.

In operation the plotting arms 13 and 14 are moved in accordance with the data supplied from the observing stations. The intersection of these arms indicates the position of the target which is plotted at regular intervals on the transparent plate by means of ink dots 27. A series of ink dots therefore represents the course of the target and serves as a basis to calculate or determine the future position or set-forward point indicated at 28. Since the plotting arms are underneath the transparent plate they will not interfere with the employment of a predicting device which is to be placed on the transparent plate to establish the set-forward point.

When the set-forward point 28 is marked on the transparent plate the predicting device is removed, the gun arm is brought into position to afford a reading of the range and azimuth of the set-forward point, and at the same time the plotting arms are operated to continuously indicate the present position of the target and to enable the course of the target to be plotted. By virtue of this continuous operation the time of determining data is considerably reduced and in addition, sudden changes in the course of the target may be noted so that firing that is based on data of an obviously incorrect set-forward point may be withheld.

Existing plotting boards may be readily converted to the present type by raising the gun arm and interposing a transparent plate between it and the station arms.

I claim:

A plotting board comprising a frame having a base portion and an arcuate portion defining an opening, an azimuth scale on the arcuate portion, a transparent cover for the opening of the frame and having its upper face adapted to be marked with positional data and to support auxiliary predicting apparatus, a gun arm pivotally mounted in the base portion of the frame and overlying the transparent cover, a pair of similar plotting arms underlying the transparent cover and pivotally mounted in the base portion of the frame whereby their intersection indicates the positional data to be marked on the upper face of the cover and means on the upper side of the frame for determining the azimuth position of each plotting arm.

JAMES C. KARNES.